US012449482B2

(12) United States Patent
Lin et al.

(10) Patent No.: US 12,449,482 B2
(45) Date of Patent: Oct. 21, 2025

(54) DISTRIBUTED COULOMB COUNTER

(71) Applicant: Analog Devices International Unlimited Company, Limerick (IE)

(72) Inventors: Yijing Lin, Beijing (CN); Yiwei Bai, Shanghai (CN); Yulei Nie, Beijing (CN)

(73) Assignee: Analog Devices International Unlimited Company, Limerick (IE)

( * ) Notice: Subject to any disclaimer, the term of this patent is extended or adjusted under 35 U.S.C. 154(b) by 411 days.

(21) Appl. No.: 18/064,099

(22) Filed: Dec. 9, 2022

(65) Prior Publication Data

US 2023/0184842 A1 Jun. 15, 2023

(30) Foreign Application Priority Data

Dec. 10, 2021 (WO) ............... PCT/CN2021/137061

(51) Int. Cl.
 *G01R 31/3832* (2019.01)
 *G01R 19/252* (2006.01)
 *G01R 31/367* (2019.01)

(52) U.S. Cl.
 CPC ....... *G01R 31/3833* (2019.01); *G01R 31/367* (2019.01); *G01R 19/252* (2013.01)

(58) Field of Classification Search
 None
 See application file for complete search history.

(56) References Cited

U.S. PATENT DOCUMENTS 7,268,714 B2  9/2007 Sherry
10,374,444 B2 * 8/2019 Worry ................. H01M 10/425
(Continued)

FOREIGN PATENT DOCUMENTS

JP  4719972 B2  4/2011
JP  2012163458 A  8/2012
(Continued)

OTHER PUBLICATIONS

"14-Channel Li-Ion Battery Cell Controller IC: MC33771C", NXP Semiconductors, [Online] Retrieved from the Internet: <URL: https://www.nxp.com/products/power-management/battery-management/battery-cell-controllers/14-channel-li-ion-battery-cell-controller-ic:MC33771C>, (Retrieved on Oct. 27, 2022), 7 pgs.

(Continued)

*Primary Examiner* — Raymond L Nimox
(74) *Attorney, Agent, or Firm* — Schwegman Lundberg & Woessner, P.A.

(57) ABSTRACT

In an example, a battery management system may include a host microcontroller, which may be operated in accordance with a first clock signal; and a first analog front end (AFE) circuit. The first AFE circuit may be operated in accordance with a second clock signal that may be unsynchronized with the first clock signal. The first AFE circuit may also include first digital circuitry to (1) accumulate a first value corresponding to a number of ADC sample cycles of the first ADC, and to (2) accumulate a second value corresponding to the digital output representative of the first battery current for the ADC sample cycles accumulated in the first value. The first AFE circuit may transfer a representation of the first value and a representation of the second value to the host microcontroller in response to a request from the host microcontroller.

20 Claims, 7 Drawing Sheets

(56) References Cited

U.S. PATENT DOCUMENTS

| | | | |
|---|---|---|---|
| 10,439,626 B2 | 10/2019 | Lassen | |
| 10,802,078 B2 | 10/2020 | Tamegai et al. | |
| 11,070,072 B2 | 7/2021 | Shi | |
| 2006/0170398 A1* | 8/2006 | Gangsto | H02J 7/0047 320/132 |
| 2007/0252575 A1 | 11/2007 | Miaille | |
| 2013/0204560 A1 | 8/2013 | Lo et al. | |
| 2017/0288439 A1 | 10/2017 | Tamegai | |

FOREIGN PATENT DOCUMENTS

| | | |
|---|---|---|
| JP | 6739235 B2 | 7/2020 |
| WO | WO-2022143542 A1 | 7/2022 |

OTHER PUBLICATIONS

"BQ76952 Data Sheet", Texas Instruments, (2021), 86 pgs.
"Data Sheet AD9250", Analog Devices, (2017), 45 pgs.
"MC33771 and MC3364 Data Sheet", NXP BV, (2018), 2 pgs.
"MC33771B_SDS Rev. 7.0 Data Sheet", NXP BV, (2021), 30 pgs.
"PB_MC33771C Rev. 2.0 Product Brief", NXP BV, (2021), 31 pgs.
"NXP Customer Information Notification", [Online] Retrieved from the Internet: URL: https: www.mouser.com catalog additional NXP_201802010I.pdf, [Retrieved on Dec. 8, 2022], (Apr. 13, 2018), 2 pgs.

* cited by examiner

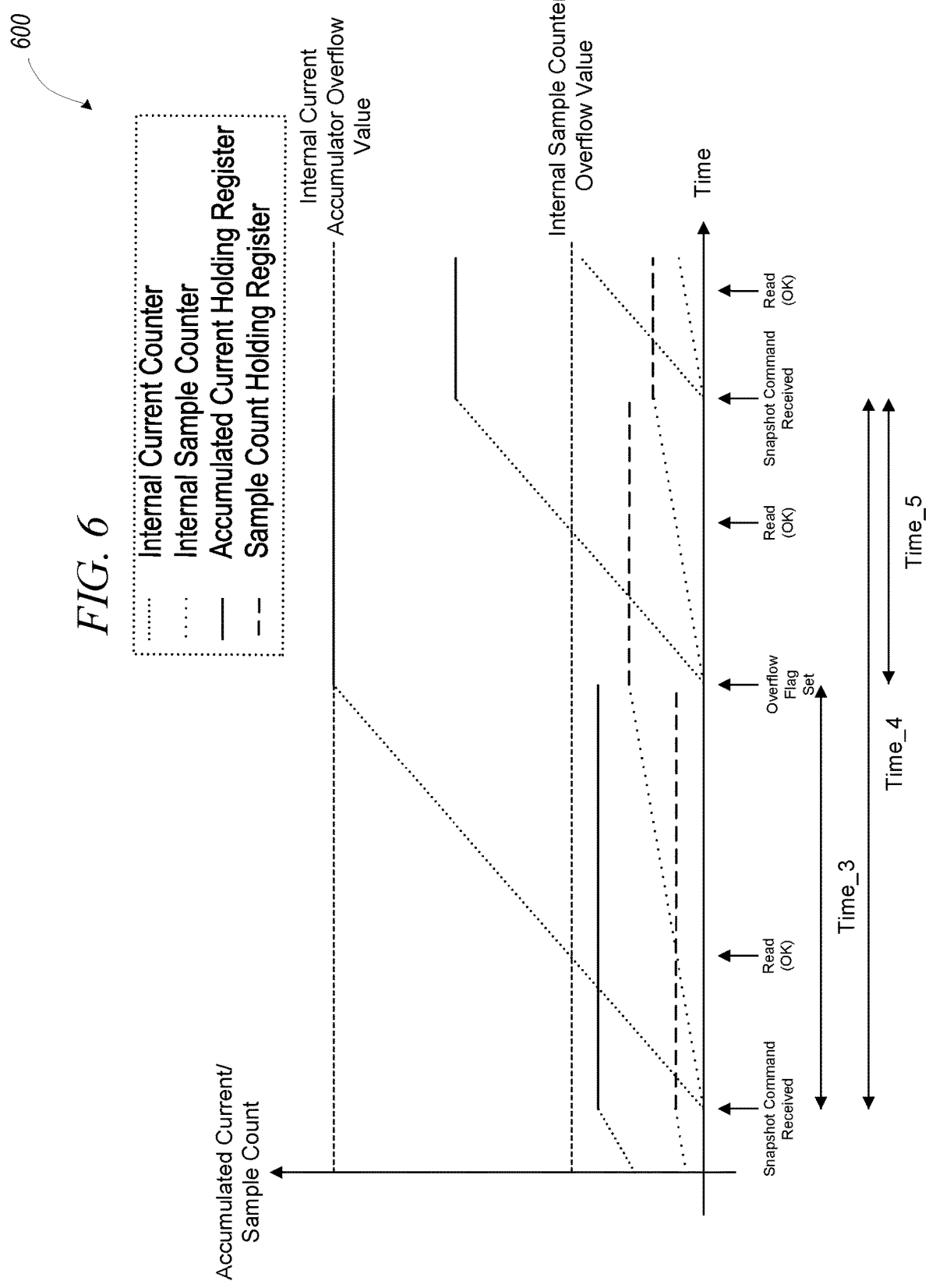

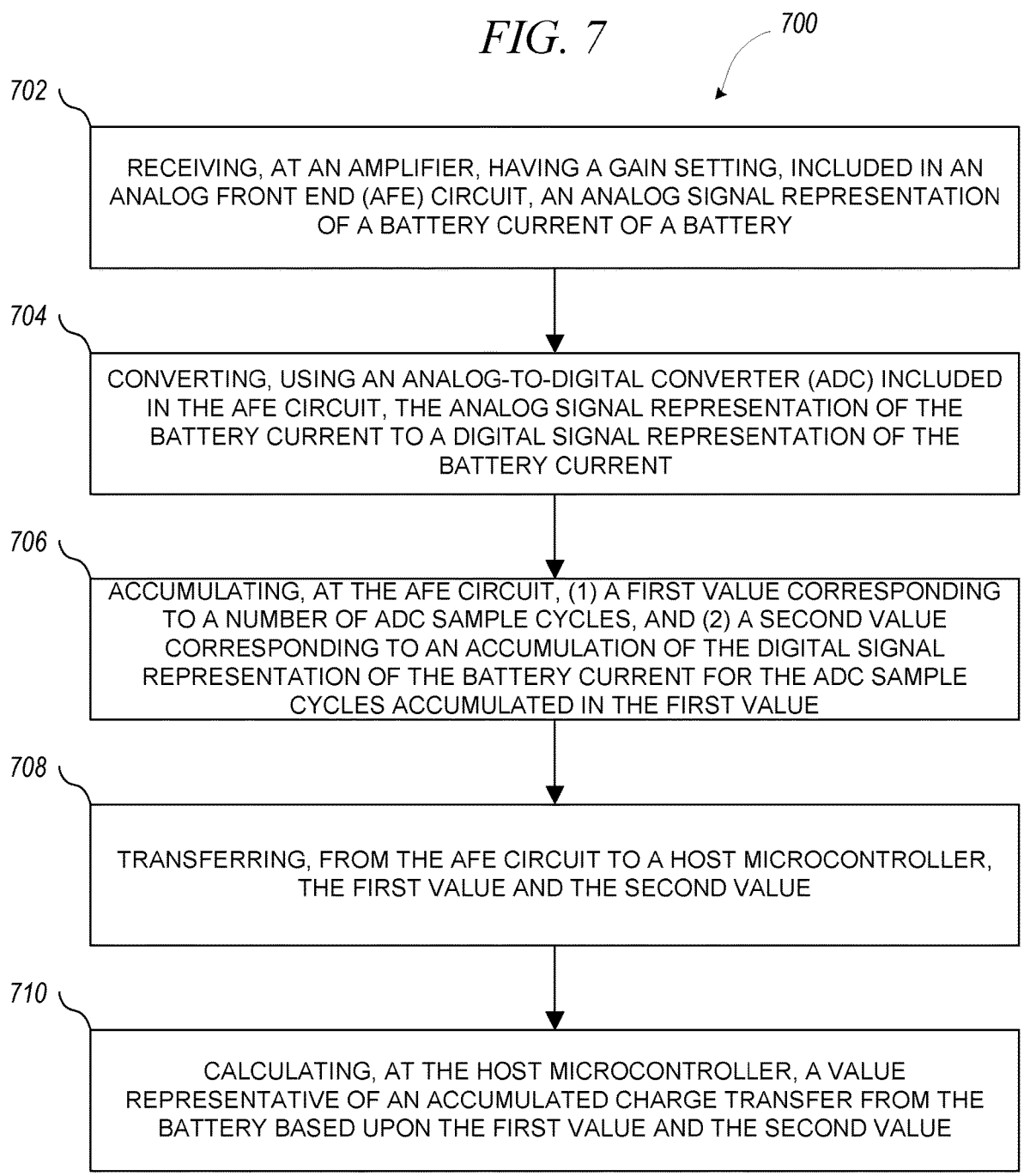

DISTRIBUTED COULOMB COUNTER

CLAIM OF PRIORITY

This patent application claims the benefit of priority of Lin et al. Patent Cooperation Treaty (PCT) Application filed in the China Intellectual Property Office as the PCT Receiving Office, PCT application Serial Number: PCT/CN2021/137061, entitled "COULOMB COUNTER DEVICES AND METHODS," filed on Dec. 10, 2021, which is hereby incorporated by reference herein in its entirety.

TECHNOLOGICAL FIELD

The present disclosure relates to electronics, and more particularly, but not by way of limitation, to a coulomb counter that can determine charge transfer from a battery or other electrochemical energy storage system.

BACKGROUND

Modern systems can use coulomb counters to determine an amount of charge transfer from an energy storage system, such as a battery. Examples of such systems include industrial electronics, electric passenger cars, electric industrial trucks, and energy storage systems. The determination of charge transfer may help in determining one or more of a system power output, a remaining system power capacity, or a state of charge (SoC) or state of health (SoH) of an energy storage system.

SUMMARY

A coulomb counter may operate by integrating a measured current value over time to determine a measurement of charge transfer. The measured current value may be updated at recurring intervals, such as corresponding to the sampling frequency of an analog-to-digital converter (ADC). The integration of these discrete current measurements may be a discrete integration, which may be performed by multiplying a discrete current measurement by a length of time between current measurements. The accuracy of the charge transfer measurement may depend upon one or more of the frequency of the current measurement, the accuracy of the current measurement, the accuracy of the time measurement, and the proper handling of the current and time measurement data.

The present inventors have recognized, among other things, that the frequency of the current measurement may be increased by using an analog front end (AFE) circuit that can sample recurrently, record results, and report recorded results back to a host microcontroller. The AFE may be able to sample more quickly than the host microcontroller. This can be due to the AFE having fewer parallel tasks or overhead tasks than the host microcontroller, or the AFE being located more closely to the charge transfer to be measured.

The AFE may also attempt to increase the accuracy of current measurements, such as by using a programmable gain amplifier (PGA) to amplify the analog current signal before conversion to a digital measured current value. The PGA may be connected to an automatic gain control (AGC) circuit that attempts to keep the analog signal provided to the ADC above a low threshold, such as to increase the usable resolution of the ADC. The AGC may attempt to keep the ADC from receiving an analog signal higher than a maximum input of the ADC, such as to prevent the loss of data due to clipping or saturation of the ADC. The AGC may be located on the AFE circuit, such as to allow for a shorter response time between the signal provided to the ADC being outside a desired range and the adjustment of the PGA using the AGC.

The present inventors have recognized, among other things, that the AFE circuit may have a less expensive or less accurate clock than the host microcontroller, which may make it desirable to offload at least a portion of the timing to the host microcontroller, such as may include offloading a portion of the timing used in charge transfer calculations. The host microcontroller may have a more accurate clock, such as a precision crystal oscillator. There may not be a shared clock signal between the AFE and the host microcontroller, such as due to a voltage level difference between the AFE and the host microcontroller. A voltage level difference may introduce a need for the use of one or more of a DC-isolated bus or level switching circuits for data and clock connections between the AFE and host microcontroller. DC-isolated buses may have restricted bandwidth, and level switching circuits may be one or more of expensive, power-hungry, or bulky. For these and other reasons, it may be desirable to use a message-based timing system to offload a portion of the timing from the AFE to the host microcontroller.

The present inventors have recognized, among other things, that the communication connection, such as a DC-isolated bus, between the AFE and the host microcontroller may be one or more of low bandwidth, crowded with a number of communication messages, or unstable. Therefore, it may be desirable to make message-based communications between the AFE and host microcontroller more robust, such as by monitoring for failed messages and resending failed messages. This document describes, among other things, systems and methods of charger transfer measurement using an AFE circuit and a host microcontroller.

In an example, a battery management system may include a host microcontroller, which may be operated in accordance with a first clock signal; and a first analog front end (AFE) circuit. The first AFE circuit may be operated in accordance with a second clock signal that may be unsynchronized with the first clock signal. The first AFE circuit may include a first gain amplifier, including first gain amplifier inputs configured to receive a first battery current associated with one or more cells in a battery system, and first gain amplifier outputs to provide a signal representative of the first battery current and a gain setting of the first gain amplifier. The first AFE circuit may also include a first analog-to-digital converter (ADC), including first ADC inputs respectively coupled to the first gain amplifier outputs, and providing a digital output representative of the first battery current. The first AFE circuit may also include first digital circuitry to (1) accumulate a first value corresponding to a number of ADC sample cycles of the first ADC, and to (2) accumulate a second value corresponding to the digital output representative of the first battery current for the ADC sample cycles accumulated in the first value. The first AFE circuit may transfer a representation of the first value and a representation of the second value to the host microcontroller in response to a request from the host microcontroller.

In an example, a method of operating a battery management system may include receiving, at an amplifier, having a gain setting, included in an analog front end (AFE) circuit, an analog signal representation of a battery current of a battery. The method may also include converting, using an analog-to-digital converter (ADC) included in the AFE circuit, the analog signal representation of the battery current to a digital signal representation of the battery current. The method may also include accumulating, at the AFE circuit, (1) a first value corresponding to a number of ADC sample cycles, and (2) a second value corresponding to an accumulation of the digital signal representation of the battery current for the ADC sample cycles accumulated in the first value. The method may also include transferring, from the AFE circuit to a host microcontroller, the first value and the second value. The method may also include calculating, at the host microcontroller, a value representative of an accumulated charge transfer from the battery based upon the first value and the second value.

In an example an analog front end (AFE) circuit for use in a charge transfer measurement system may include a gain amplifier, including gain amplifier inputs configured to receive a current of interest, and gain amplifier outputs to provide a signal representative of the current of interest and a gain setting of the gain amplifier. The AFE circuit may also include an analog-to-digital converter (ADC), including ADC inputs respectively coupled to the gain amplifier outputs, and providing a digital output representative of the current of interest. The AFE circuit may also include digital circuitry to (1) accumulate a first value corresponding to a number of ADC sample cycles of the ADC, and to (2) accumulate a second value corresponding to the digital output representative of the current of interest for the ADC sample cycles accumulated in the first value, The AFE circuit may transfer a representation of the first value and a representation of the second value to a microcontroller, the transfer may occur over a DC-isolated bus.

BRIEF DESCRIPTION OF THE DRAWINGS

FIG. 6 is a graph in time showing an example of operating portions of an AFE circuit.

FIG. 7 is a flow chart showing an example of a method for operating portions of a charge transfer measurement system.

DETAILED DESCRIPTION

The present disclosure relates to systems and methods of charge transfer measurement using an AFE circuit and a host microcontroller, such as can include using robust, message-based, communication.

Charge transfer through a system, such as an energy storage system, can be calculated by integrating the current flowing through the system with respect to time according to the following equation:

$$Q=\int Idt$$

where Q is the charge transfer and I is the current. I may be constant or may have different values at different times. In a discrete system, such as a digital system, discrete integration may be used to determine charge transfer according to the following equation:

$$Q=\Sigma I \Delta T$$

Discrete integration may only provide an approximation of charge transfer, such as due to one or more of I varying over time, inaccurate measurements of I, or inaccurate measurements of $\Delta T$. A more rapid change in I over time may result in a less accurate measurement of charge transfer. A smaller time increment, $\Delta T$, may result in a more accurate measurement of charge transfer. More accurate measurements of I and $\Delta T$ may result in a more accurate measurement of charge transfer. Charge transfer may be measured in a unit such as the coulomb, which is equal to the amount of charge transferred in one second by one ampere of current.

Figure 1:
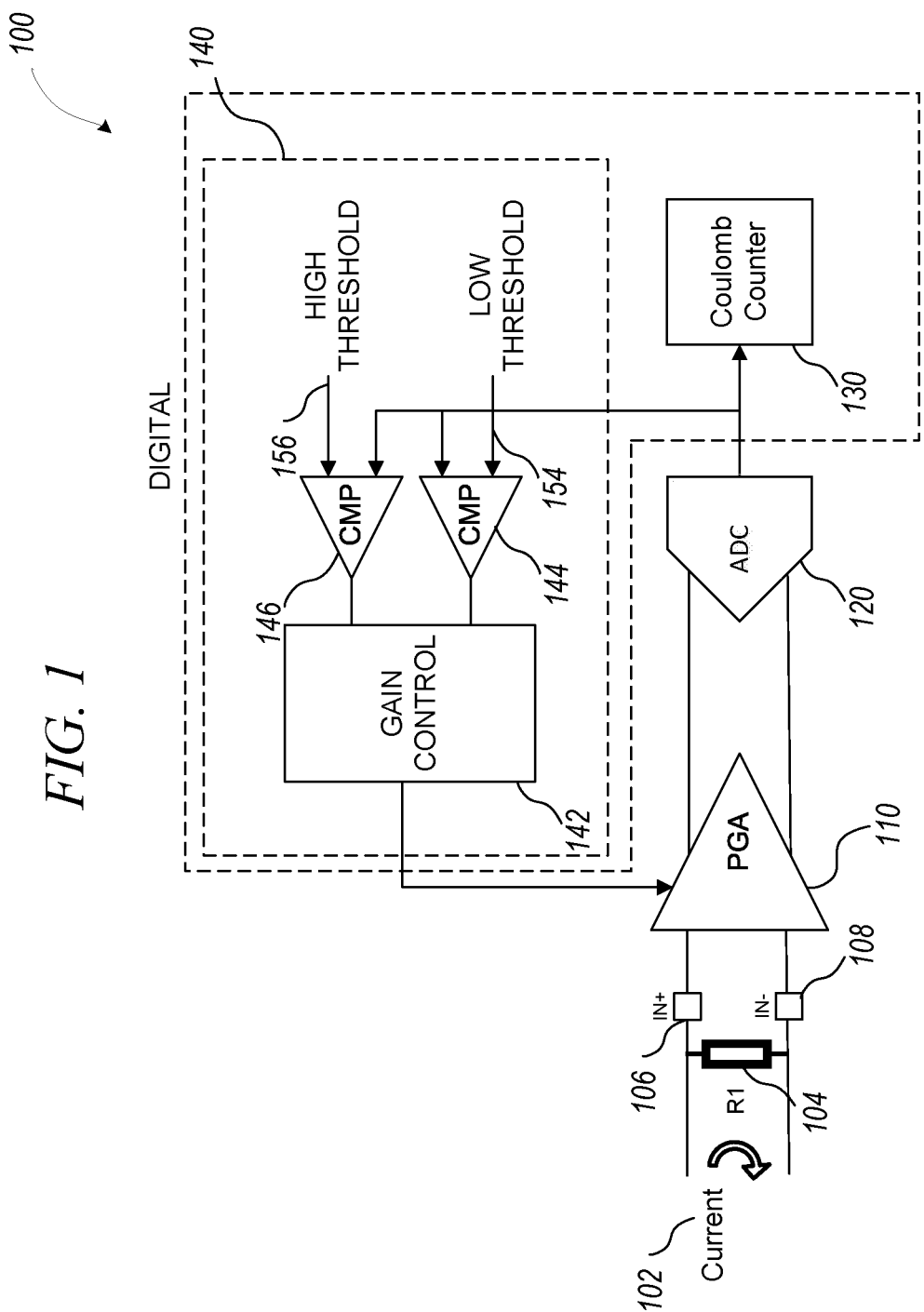
FIG. 1 is a schematic drawing of an example of portions of an analog front end (AFE) circuit.

FIG. 1 is a schematic drawing of an example of portions of an analog front end (AFE) circuit 100. In the example of FIG. 1, the AFE circuit 100 may include a programmable gain amplifier (PGA) circuit 110, an analog-to-digital converter (ADC) 120, a coulomb counter circuit 130, and an automatic gain control (AGC) circuit 140.

The AFE circuit 100 may include a resistor 104 to convert a current 102 through the resistor 104 to a voltage across the resistor 104. The resistor 104 may be included in the AFE circuit 100 and the current 102 may pass through the AFE circuit 100. The resistor 104 and the current 102 may be external to the AFE circuit 100, and the voltage across the resistor 104 may be passed into the AFE circuit 100 using a first input terminal 106 and a second input terminal 108. The voltage across the resistor 104 may be coupled to an input of the PGA circuit 110.

The current 102 may represent any current of interest, such as a current through an energy storage system. For example, the current 102 may correspond to a current through one or more cells in a battery system. There may be more than one battery, and there may be an AFE circuit 100 corresponding to individual ones of the more than one batteries.

The PGA circuit 110 may have an analog input coupled across the resistor 104. The PGA circuit 110 may have an analog output coupled to an input of the ADC 120. The PGA circuit 110 may multiply the analog input by a gain value before transmitting the multiplied result to the analog output. The gain value may be greater than 1, such as may result in an amplification of the analog input. The gain value may be equal to 1, such as may result in transmitting the analog input unchanged to the analog output. The gain value may be less than 1, such as may result in a reduction in the magnitude of the analog input. The gain value may be programmable, and may be able to take on a range of values. The range of values may be continuous, or there may be discrete values of gain that the PGA circuit 110 can provide.

The ADC 120 may take in an analog signal input from the PGA circuit 110 and convert the analog signal input into a digital representation for output. The ADC 120 may convert the analog signal input to a digital output using analog-to-digital conversion circuitry employing a conversion technique such as delta-sigma, successive approximation, flash, or integration. The ADC output signal may have a number of bits of resolution, such as can include 8, 10, 12, 14, 16, or 32 bits. The ADC 120 may accept a range of input values, such as can include 0V to 5V, 0V to 10V, or 0V to 100V. The ADC 120 may be a differential ADC. The ADC 120 may accept a range of differential input values, such as can include −5V to 5V, −10V to 10V, or −100V to 100V. The output of the ADC 120 may be connected to the coulomb counter circuit 130 and the AGC circuit 140.

The AGC circuit 140 may include a gain control circuit 142, a first comparator 144, a second comparator 146, a low threshold value 154, and a high threshold value 156. The gain control circuit 142 may accept as inputs the output of the first comparator 144 and the second comparator 146. The gain control circuit 142 may have an output connected to the PGA circuit 110.

The first comparator 144 may operate to compare a first input to a second input. The first comparator 144 may make a comparison of the first input and the second input and may output a logical low value when the first input is greater than or exceeds the second input. The first comparator 144 may output a logical high value when the first input is less than or equal to the second input. The second comparator 146 may operate similarly to the first comparator 144 or may differ in one or more ways. The output from the ADC 120 may be connected as the first input to the first comparator 144 and the second input to the second comparator 146. A low threshold value 154 may be connected as the second input to the first comparator 144. A high threshold value 156 may be connected as the first input to the second comparator 146.

When the ADC 120 output value is less than or equal to the low threshold value 154, the first comparator 144 may output a logical high value to the gain control circuit 142. In response to the logical high value from the first comparator 144, the gain control circuit 142 may operate to increase a gain of the PGA circuit 110. When the ADC 120 output value is greater than or equal to the high threshold value 156, the second comparator 146 may output a logical high value to the gain control circuit 142. In response to the logical high value from the second comparator 146, the gain control circuit 142 may operate to decrease a gain of the PGA circuit 110.

The low threshold value 154 may be selected to be a specified percentage of the full-scale range of the ADC 120, such as may include 5%, 10%, 15%, 20%, 25%, or 30%. The high threshold value 156 may be selected to be a specified percentage of the full-scale range of the ADC 120, such as may include 70%, 75%, 80%, 85%, 90%, or 95%.

The gain control circuit 142 may send a specific gain value to the PGA circuit 110. The gain control circuit 142 may send a signal to the PGA circuit 110 instructing the PGA circuit 110 to increase the gain or decrease the gain. The AGC circuit 140 and the PGA circuit 110 may be configured to work together to keep the ADC 120 operating between the low threshold value 154 and the high threshold value 156. This may help increase the accuracy of the coulomb counter circuit 130.

Figure 2:
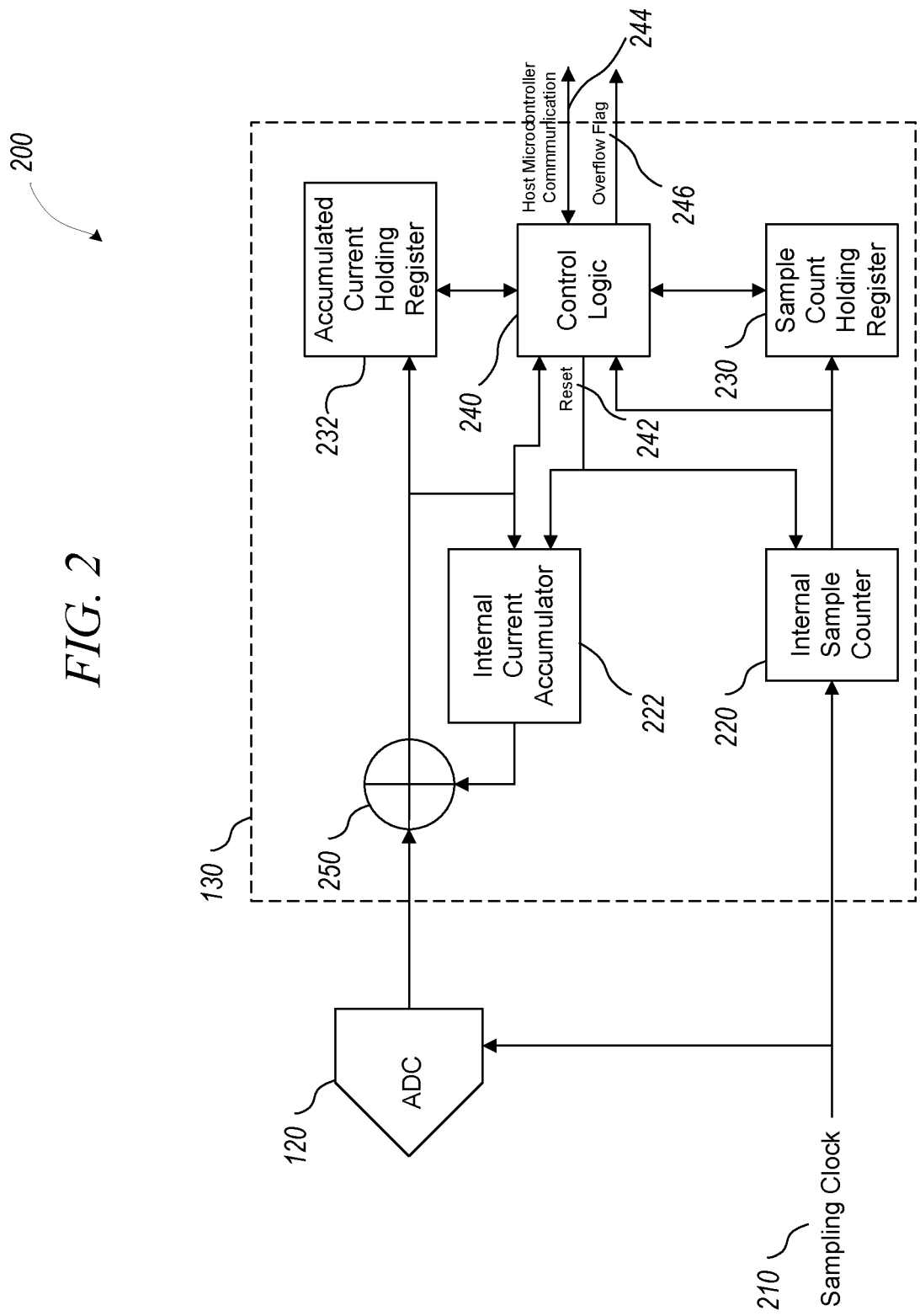
FIG. 2 is a schematic drawing of an example of portions of an AFE circuit.

FIG. 2 is a schematic drawing 200 of an example of portions of an AFE circuit 100. In FIG. 2, the AFE circuit 100 may include an ADC 120, a coulomb counter circuit 130, and a sampling clock signal 210. The sampling clock signal 210 may be provided by a circuit internal to the AFE circuit 100, or the sampling clock signal 210 may be provided by another circuit. The sampling clock signal 210 may be a divided value of a high-speed clock on the AFE circuit 100, such as a division of the high-speed clock by an integer value. The sampling clock may be connected to the ADC 120. The sampling clock may be connected to the coulomb counter circuit 130. The sampling clock may operate to sequence a conversion of the ADC 120, such as may result in the ADC 120 taking one sample for each cycle of the sampling clock signal 210. The coulomb counter circuit 130 may use the sampling clock signal 210 to sequence an operation of the coulomb counter circuit 130, such as the collection of the output of the ADC 120. The sampling clock signal 210 may have a consistent or substantially consistent frequency.

The coulomb counter circuit 130 may include an internal sample counter 220, an adder circuit 250, an internal current accumulator 222, a sample count holding register 230, an accumulated current holding register 232, and control logic circuitry 240. The internal sample counter 220 may be connected to receive the sampling clock signal 210. The internal sample counter 220 may count the number of cycles of the sampling clock signal 210 and store the cycle value in an internal register. The internal sample counter 220 may be connected to receive a "reset" command 242 from the control logic circuitry 240. In response to a "reset" command 242 from the control logic circuitry 240, the internal sample counter 220 may transfer the count of sample clock cycles to the sample count holding register 230 and may reset the count of sample clock cycles, such as a reset to 0. Following the reset of the count of sample clock cycles, the internal sample counter 220 may start accumulating a count of sample clock cycles. In an example, the internal sample counter 220 may start accumulating a count of sample clock cycles immediately following the reset and without requiring receiving another signal from the control logic circuitry 240.

The internal current accumulator 222 may be configured to keep a running total of the ADC 120 output for each sampling clock cycle. The internal current accumulator 222 may provide a value of an accumulated current register to the adder circuit 250. The adder circuit 250 may also receive as an input the ADC 120 output. The adder circuit 250 may provide the sum of the accumulated current register and the ADC 120 output, which the internal current accumulator 222 may store in the accumulated current register until the next sampling clock signal 210 cycle. The internal current accumulator 222 may be configured to keep account of gain values of the PGA circuit 110 for a given reading of the ADC 120, such as by dividing the output of the ADC 120 by the gain value of the PGA circuit 110 before accumulation.

The internal current accumulator 222 may be connected to receive a "reset" command 242 from the control logic circuitry 240. In response to a "reset" command 242 from the control logic circuitry 240, the internal current accumulator 222 may transfer the value of the accumulated current register to the accumulated current holding register 232, and may reset the value of the accumulated current register, such as a reset to 0. Following the reset of the accumulated current register, the internal current accumulator 222 may start accumulating ADC 120 output values. In an example, the internal current accumulator 222 may start accumulating ADC 120 output values immediately following the reset and without requiring receiving another signal from the control logic circuitry 240.

The control logic circuitry 240 may be configured to communicate with a host microcontroller, such as over a communication bus 244. The control logic circuitry 240 may be able to send an overflow flag signal 246 to the host microcontroller. In an example, the overflow flag signal 246 may be sent over the communication bus 244. In an example, the overflow flag signal 246 may be sent over a separate communication link. The control logic circuitry 240 may be connected to the internal sample counter 220, the internal current accumulator 222, the sample count holding register 230, and the accumulated current holding register 232. The control logic circuitry 240 may be configured to respond to a number of commands or requests from the host microcontroller, such as a "snapshot" command or a "read" command. The control logic circuitry 240 may be configured to send a "reset" command 242 to the internal sample counter 220 and the internal current accumulator 222.

In response to a "snapshot" command from the host microcontroller, the control logic circuitry 240 may send a "reset" command 242 to one or more of the internal sample counter 220 or the internal current accumulator 222. In an example, the control logic circuitry 240 may send a "reset" command 242 to both the internal sample counter 220 and the internal current accumulator 222 following a "snapshot" command from the host microcontroller. In an example, the "reset" command 242 sent to the internal sample counter 220 and the internal current accumulator 222 may result in the internal sample counter 220 storing the count of sample cycles in the sample count holding register 230 and the internal current accumulator 222 storing the accumulated current value in the accumulated current holding register 232.

In response to a "read" command from the host microcontroller, the control logic circuitry 240 may transmit the value from the accumulated current holding register 232 and the value from the sample count holding register 230 to the host microcontroller. Following the "read" command, the value of the sample count holding register 230 and the value of the accumulated current holding register 232 may remain unchanged. In an example, the value of the sample count holding register 230 and the value of the accumulated current holding register 232 may not change unless the AFE circuit 100 receives a "snapshot" command from the host microcontroller. In an example, the host microcontroller 310 may be configured to be able to directly access the sample count holding register 230 and the accumulated current holding register 232 and may be configured to be able to read their respective values without requiring sending a message to the control logic circuitry 240. In an example, the AFE circuit 100 may accept a "reset all" command from the host microcontroller. The "reset all" command from the host microcontroller may cause the control logic circuitry 240 to reset one or more of the internal sample counter 220, internal current accumulator 222, sample count holding register 230, or accumulated current holding register 232.

Figure 3:
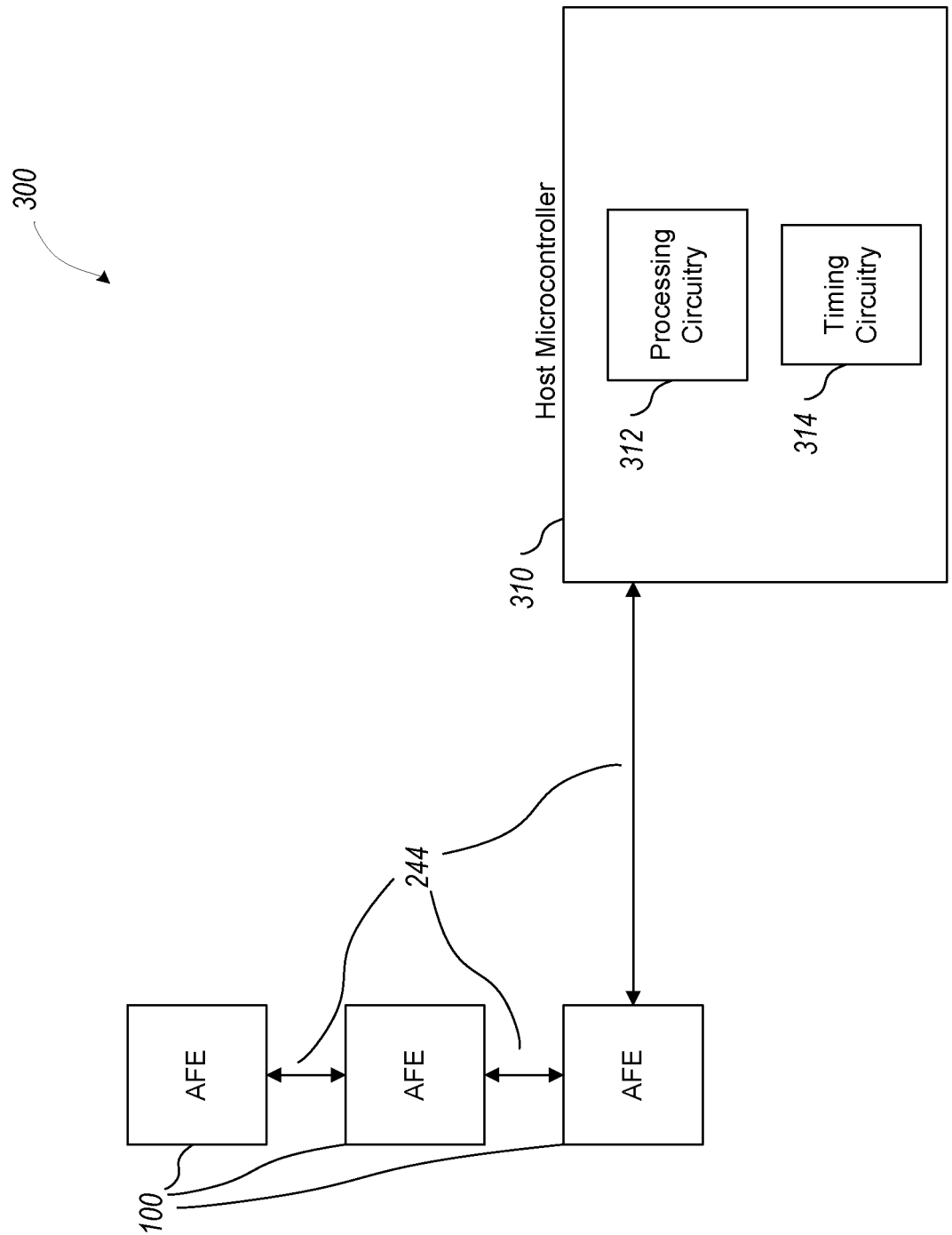
FIG. 3 is a block diagram showing an example of a portion of a charge transfer measurement system including a number of AFE circuits and a host microcontroller.

FIG. 3 is a block diagram 300 showing an example of a portion of a charge transfer measurement system including a number of AFE circuits 100 and a host microcontroller 310. In FIG. 3, the host microcontroller 310 may be connected to the AFE circuits 100 using a communication bus 244. The AFE circuits 100 may be arranged serially or "daisy-chained" with respect to the communication bus 244. In an example, the AFE circuits 100 may be connected in parallel or in a "star" format. In an example, the AFE circuits 100 may be connected using a combination of "daisy-chained" and "star" formats. Each of the AFE circuits 100 need not be directly connected to the host microcontroller 310 with a communication bus 244, but each of the AFE circuits 100 may be able to communicate to the host microcontroller 310 over the communication bus 244, such as may include communicating to the host microcontroller 310 through one or more other AFE circuits 100.

The communication bus 244 may transmit digital or analog signals. In an example, the communication bus 244 is a digital serial bus carrying data between various circuits. The communication bus 244 may be a DC-isolated bus that uses at least one of capacitive-coupling or inductive-coupling to connect circuits operating at different voltage levels due to their connection to the energy storage system at differing points. A transformer may be used at various points along the communication bus 244 such as to provide DC isolation and inductive-coupling. A capacitor may be used at various points along the communication bus 244 to provide DC isolation and capacitive coupling. In an example, the communication bus 244 may have a limited bandwidth such as to conserve resources due to the need for DC isolation or voltage level shifting circuitry between host microcontroller 310 and the AFE circuits 100. In an example, the communication bus 244 may not need or have a universally shared clock signal between all of the connected circuits. In an example, the host microcontroller 310 and one or more of the AFE circuits 100 have their own local clocks that can be asynchronous with one another. The system may avoid distributing a clock signal because of the difficulty and expense or power consumption of distributing a clock signal between circuits at different DC voltage levels.

The host microcontroller 310 may include processing circuitry 312 and timing circuitry 314. The host microcontroller 310 may operate according to an internal clock signal, such as a precision crystal oscillator. The clock of the host microcontroller 310 may not be synchronized, or may be unsynchronized, with the respective clocks of the AFE circuits 100. The host microcontroller 310 may send commands to a specific AFE circuit 100, or read a register of a specific AFE circuit 100, such as by addressing each of the various AFE circuits 100 using a unique identifier number or code. The host microcontroller 310 may be able to verify that a command was one or more of successfully received or successfully executed by an AFE circuit 100. The AFE circuit 100 may have circuitry, such as may include a command counter. The command counter may help the host microcontroller 310 verify that a command was one or more of successfully received or successfully executed by the AFE circuit 100. The host microcontroller 310 may be able to retry a command, or issue a second similar command, following an unsuccessfully executed command. The host microcontroller 310 may be able to verify that the value returned by reading a register in an AFE circuit 100 is the correct value, such as by using error-checking values and error-checking logic.

The timing circuitry 314 may be configured to determine a period of time between respective "snapshot" commands sent to a given AFE circuit 100. The timing circuitry 314 may use the internal clock of the host microcontroller 310 to determine the time period between "snapshot" commands. The value of time between "snapshot" commands measured at the host microcontroller 310 may be more accurate than a value of time measured at the AFE circuit 100 because the internal clock of the host microcontroller 310 may be more accurate than the internal clock of the AFE circuit 100. The timing circuitry 314 may take into account the travel time of "snapshot" commands to the AFE circuit 100, such as by performing a calibration using "ping" signals to determine a roundtrip latency of the communication bus 244 to an AFE circuit 100. The timing circuitry 314 may verify that a "snapshot" command was received successfully before using the timing of the command to determine a time period.

The processing circuitry 312 may include software-based processing circuitry, and may be capable of performing various mathematical operations. The processing circuitry 312 may be used to calculate a value of charge transfer based upon values received from the AFE circuit 100 and time values from the processing circuitry 312.

Figure 4:
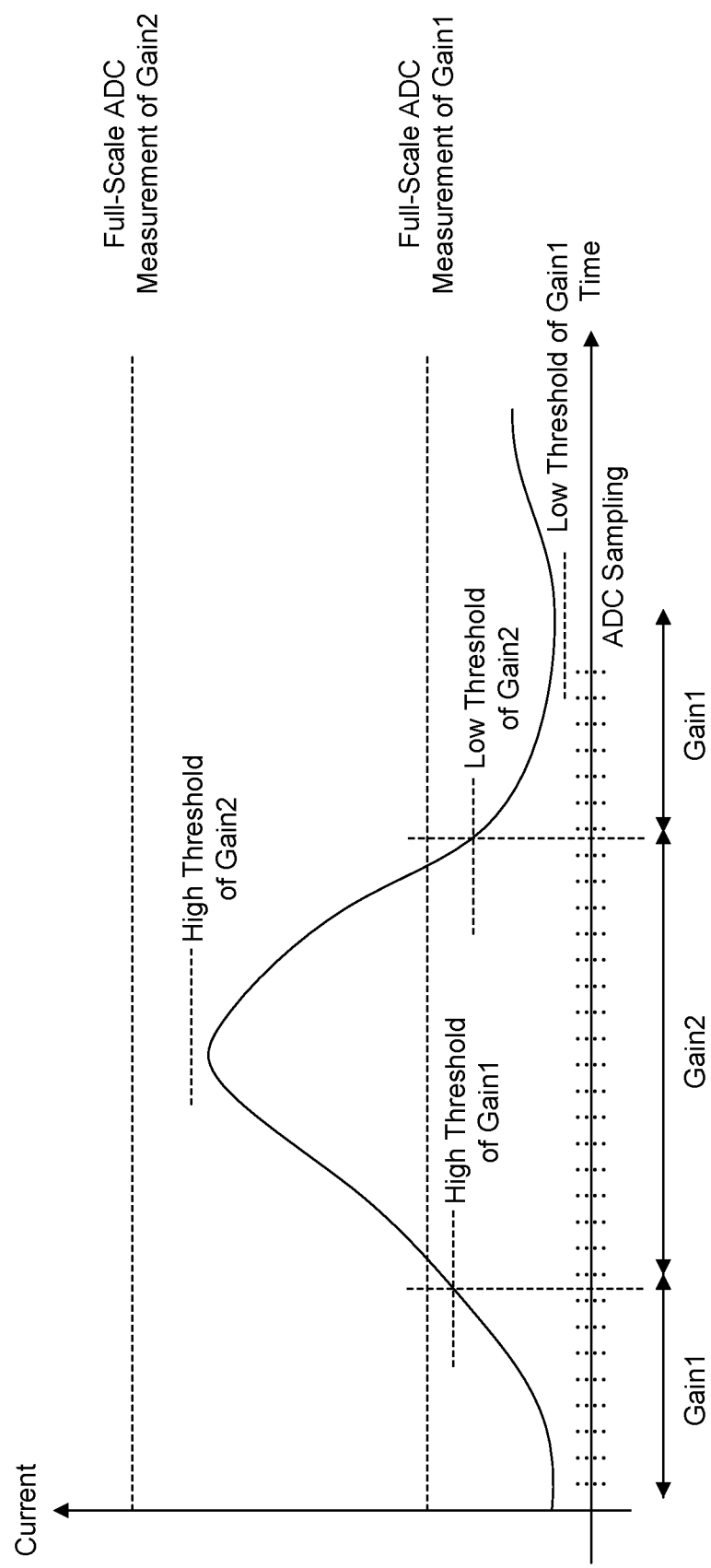
FIG. 4 is a graph in time showing an example of operating portions of an AFE circuit.

FIG. 4 is a graph in time 400 showing an example of operating portions of an AFE circuit 100. In FIG. 4, a theoretical current measured by the AFE circuit 100 is shown over time. A line is shown that may represent the full-scale current value measurable by the ADC 120 when the AGC circuit 140 is using a gain value of Gain1. A line is shown that may represent the full-scale current value measurable by the ADC 120 when the AGC circuit 140 is using a gain value of Gain2. The full-scale line for Gain2 may be higher than the full-scale line for Gain1 because Gain2 has a smaller value than Gain 1.

Lines that may represent the high threshold current value and the low threshold current value for Gain1 and Gain2 may be shown. The graph in time 400 shows the initial gain value may be Gain1 and the current initially may be below the high threshold of Gain1. Some period of time and some number of ADC samples later, the current may increase over the high threshold of Gain1. The AFE circuit 100 may not be aware that current has increased above the high threshold of Gain 1 until the next ADC sample. Following the next ADC sample, the AGC circuit 140 may decrease the gain of the PGA circuit 110 to Gain2. The value of the current may stay between the high threshold of Gain2 and the low threshold of Gain2 for some period of time. The value of the current may decrease below a low threshold of Gain2. Following the next ADC sample, the AGC circuit 140 may decrease increase the gain of the PGA circuit 110 to Gain1.

The values of Gain1 and Gain2, the low threshold value 154 as a percentage of the full range of the ADC 120, and the high threshold value 156 as a percentage of the full range of the ADC 120 may be selected for stable and reliable operation of the AFE circuit 100. For example, the gain values may be selected from discrete increments, and the discrete increments may be selected to provide a margin between the high threshold of Gain1 and the low threshold of Gain2. This margin may provide the system with hysteresis, such as to attempt to prevent the system from oscillating between Gain1 and Gain2, or to attempt to prevent the system from switching to Gain2 and then back to Gain1 too quickly. The AFE circuit 100 may also be configured to increase the time that the ADC 120 is operating in a desired range of the full-scale range of the ADC 120, such as may increase the accuracy of the ADC 120. In an example, the ADC 120 may be provide more accurate measurements when it is operating in the upper 50% of the full-scale range of the ADC 120, such as may be due to the bit-resolution of the ADC 120 comprising a smaller percentage of the measured digital value.

Figure 5:
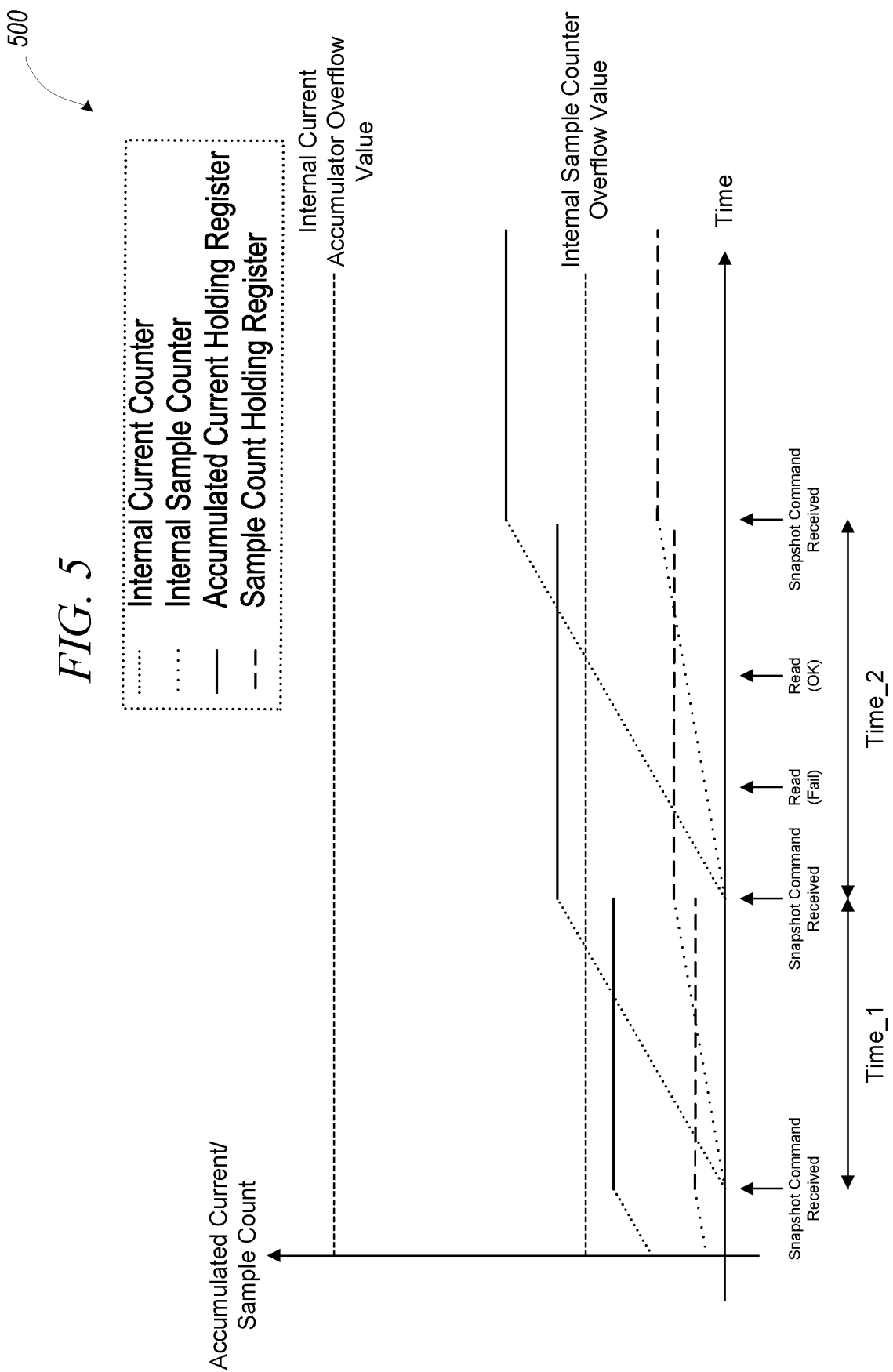
FIG. 5 is a graph in time showing an example of operating portions of an AFE circuit.

FIG. 5 is a graph in time 500 showing an example of operating portions of an AFE circuit 100. In the example of FIG. 5, a theoretical current may be sampled by the AFE circuit 100. The theoretical current may have a non-zero value. The theoretical current may be constant or substantially constant for the portion of time shown in FIG. 5. The internal sample counter 220 may have an overflow value, such as may be due to a software setting or hardware configuration. The overflow value of the internal sample counter 220 may be determined by the maximum storage capacity of a register, such as may be the maximum integer storage value of an 8, 16, 32, or 64 bit register. In an example, the internal sample counter 220 may store the sample count in a register as an unsigned integer. In an example the maximum capacity of the internal sample counter 220 may be one or more of 255, 256, 65, 535, 65, 536. In an example, the maximum capacity of the internal sample counter 220 may range from at least 500 to at least 100,000. The internal current accumulator 222 may have an overflow value, such as may be due to a software setting or hardware configuration. The overflow value of the internal current accumulator 222 may be determined by the maximum storage capacity of a register, such as may be the maximum floating point or integer storage value of an 8, 16, 32, or 64 bit register. In an example, the maximum storage capacity of the internal current accumulator 222 may range from at 10,000 to at least 10,000,000, or from at least 10,000.0 to at least 10,000,000.0.

The AFE circuit 100 may receive a first "snapshot" command and may perform a number of operations that may be associated with the "snapshot" command. The AFE circuit 100 may store the value in the internal sample counter 220 to the sample count holding register 230 and reset the internal sample counter 220. The AFE circuit 100 may store the value in the internal current accumulator 222 to the accumulated current holding register 232 and reset the internal current accumulator 222. The host microcontroller 310 may begin measuring Time_1, which may correspond to the time following the first "snapshot" command, such as by using the timing circuitry 314.

The AFE circuit 100 may receive a second "snapshot" command and may perform a number of operations that may be associated with the "snapshot" command. The AFE circuit 100 may store the value in the internal sample counter 220 to the sample count holding register 230 and reset the internal sample counter 220. The AFE circuit 100 may store the value in the internal current accumulator 222 to the accumulated current holding register 232 and reset the internal current accumulator 222. The host microcontroller 310 may record the value of Time_1, which may correspond to the time between first and second "snapshot" commands. The host microcontroller 310 may begin recording Time_2, which may correspond to the time following the second snapshot command.

The host microcontroller 310 may attempt to "read" the value of the sample count holding register 230 and the accumulated current holding register 232, such as may be by sending a "read" command to the AFE circuit 100 or by reading the value of one or more registers in the AFE circuit 100 directly. The first "read" attempt by the host microcontroller 310 may fail, such as may be due to a communication error on the communication bus 244. Following the first "read" attempt by the host microcontroller 310 the value in the sample count holding register 230 and the accumulated current holding register 232 may remain unchanged. This may allow the host microcontroller 310 to attempt one or more additional "read" attempts by the host microcontroller 310 without losing data.

The host microcontroller 310 may attempt a second "read," which may be successful and may result in the transfer of the value of the sample count holding register 230 and the value of the accumulated current holding register 232 to the host microcontroller. Following the successful "read," the host microcontroller 310 may issue another "snapshot" command, which may result in the data read during the second "read" attempt being overwritten.

The host microcontroller 310 may calculate a charge transfer using one or more of the value of Time_1, the value of the sample count holding register 230, or the value of the accumulated current holding register 232. The host microcontroller 310 may attempt to calculate an average current value during Time_1 by using the values that were accumulated during Time_1. The host microcontroller 310 may divide the value of the accumulated current holding register 232 by the value of the sample count holding register 230, which may be according to the following equation:

$$\text{Average Current} = \frac{\text{Accumulated Current}}{\text{Number of Samples}}$$

This equation may provide a value that is substantially equal to or representative of the average current during Time_1. A consistent sampling period, such as a sampling period that varies little over time, may result in a more accurate measurement of average current. A consistent current value, such as a current that varies little over time, may result in a more accurate measurement of average current. The host microcontroller 310 may attempt to calculate the charge transfer by multiplying the calculated average current by Time_1, which may be according to the following equation:

$$\text{Charge Transfer} = \text{Average Current} * \text{Time}_1$$

$$\text{Charge Transfer} = \frac{\text{Accumulated Current}}{\text{Number of Samples}} * \text{Time}_1$$

This equation may provide a value that is substantially equal to or representative of the charger transfer during Time_1. The accuracy of the charge transfer measurement may depend upon the accuracy of the measurement of Time_1 and the accuracy of the average current value. This may make a calculation of charge transfer at the host microcontroller 310 using a precise clock more accurate than a calculation of charge transfer at the AFE circuit 100 using a less precise clock. Using the method of accumulating the measured current value and accumulating the number of current samples, the AFE circuit 100 may be able to offload a portion of the timing determination to the host microcontroller 310.

FIG. 6 is a graph in time 600 showing an example of operating portions of an AFE circuit 100. In the example of FIG. 6, between the first "snapshot" command and the second "snapshot" command, the internal current accumulator 222 may reach the overflow value, or other overflow condition, and may overflow. The internal current accumulator 222 may reach the overflow value due to one or more of an increase in the measured current, loss of an intermediate "snapshot" command along the communication bus 244, or the inability of the host microcontroller 310 to send an intermediate "snapshot command, such as may be due to the host microcontroller 310 servicing another AFE circuit 100, tending to other tasks, or malfunctioning.

Following the overflow, the AFE circuit 100 may operate as if it received a snapshot command. The AFE circuit 100 may transfer the value of the internal sample counter 220 to the sample count holding register 230 and reset the internal sample counter 220. The AFE circuit 100 may transfer the value of the internal current accumulator 222 to the accumulated current holding register 232 and reset the internal current accumulator 222. The AFE circuit 100 may set an overflow flag. The overflow flag may correspond to the internal current accumulator 222, and may be part of an overflow register which may hold additional overflow flags or other flags. The host microcontroller 310 may also read the overflow flag or the overflow register during a "read," such as to determine if an overflow has occurred.

The AFE circuit 100 may send an interrupt or other signal to the host microcontroller 310 to alert the host microcontroller 310 that an overflow has occurred. The overflow interrupt received by the host microcontroller 310 may cause the host microcontroller 310 to send a signal to the timing circuitry 314, such as to record Time_3. Time_3 may be the time between the first "snapshot" command and the receipt of the overflow interrupt. The host microcontroller 310 may attempt a "read" to obtain the values of the sample count holding register 230 and the accumulated current holding register 232. Following a successful read, the host microcontroller 310 may use the values obtained in the read and Time_3 to calculate a value that may correspond to the charge transfer during Time_3. In this way, a portion or all of the data corresponding to Time_3 may be recovered even though the internal current accumulator 222 has overflowed.

Following a successful read, the host microcontroller 310 may send a second "snapshot" command. Following the snapshot command, the host microcontroller 310 may record Time_4. Time_4 may represent the time between the first and second "snapshot" command. The host microcontroller 310 may also record Time_5. Time_5 may represent the time between the receipt of the overflow interrupt and the second "snapshot" command. In an example, Time_5 may be calculated by subtracting Time_3 from Time_4.

Following the second "snapshot" command, the host microcontroller 310 may attempt a second "read." Following a successful read, the host microcontroller 310 may use the values obtained from the sample count holding register 230 and the accumulated current holding register 232 and Time_5 to calculate a charge transfer value for Time_5. In an example, the host microcontroller 310 may sum the values obtained from the first and second "reads" and use these summed values and Time_4 to calculate a value of charge transfer for the period of Time_4.

The overflow of the internal current accumulator 222 may result in a loss of data, which may result in an inaccurate or less accurate measure of charge transfer for the period of time in which the overflow occurred. The AFE circuit 100 may be configured such that an overflow of the internal current accumulator 222 may not result in a loss of data, such as by storing a value of the internal current accumulator 222 in the accumulated current holding register 232 before a register in internal current accumulator 222 overflows a maximum storage capacity, and resetting the internal current accumulator 222. In this way, the AFE circuit 100 may be able to accumulate a current substantially equal to twice the overflow value of the internal current accumulator 222 without losing data. In an example, the system may be configured so that multiple overflows in a row can occur and be handled by the host microcontroller 310 without losing data, such as by completing a "read" between each successive overflow.

The operation of the AFE circuit 100 may be similar for an overflow of the internal sample counter 220 as it is for an overflow of the internal current accumulator 222.

FIG. 7 is a flow chart 700 showing an example of a method for operating portions of a battery management system. At 702—an analog signal representation of a battery current of a battery can be received at an amplifier, having a gain setting, included in an analog front end (AFE) circuit. At 704—the analog signal representation of the battery current can be converted to a digital representation of the battery current using an analog-to-digital converter (ADC) included in the AFE circuit. At 706—the AFE circuit can accumulate, (1) a first value corresponding to a number of ADC sample cycles, and (2) a second value corresponding to an accumulation of the digital signal representation of the battery current for the ADC sample cycles accumulated in the first value. At 708—the first value and the second value can be transferred from the AFE circuit to a host microcontroller. At 710—the host microcontroller can calculate a value representative of an accumulated charge transfer from the battery based on the first value and the second value. The shown order of steps is not intended to be a limitation on the order the steps are performed in. In an example, two or more steps may be performed simultaneously or at least partially concurrently.

The systems, techniques, and methods described herein are believed to apply, at least in part, to AFE circuits 100 using voltage ADCs and current ADCs. In an example the AFE circuit 100 may measure both positive and negative current, such as may be due to charging and discharging, respectively.

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc., are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Such instructions can be read and executed by one or more processors to enable performance of operations comprising a method, for example. The instructions are in any suitable form, such as but not limited to source code, compiled code, interpreted code, executable code, static code, dynamic code, and the like.

Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A battery management system comprising:
   a host microcontroller, operated in accordance with a first clock signal;
   a first analog front end (AFE) circuit, wherein the first AFE circuit is operated in accordance with a second clock signal that is unsynchronized with the first clock signal, the first AFE circuit comprising:
      a first gain amplifier, including first gain amplifier inputs configured to receive a first battery current associated with one or more cells in a battery system, and first gain amplifier outputs to provide a signal representative of the first battery current and a gain setting of the first gain amplifier;
      a first analog-to-digital converter (ADC), including first ADC inputs respectively coupled to the first gain amplifier outputs, and providing a digital output representative of the first battery current;
      first digital circuitry to (1) accumulate a first value corresponding to a number of ADC sample cycles of the first ADC, and to (2) accumulate a second value corresponding to the digital output representative of the first battery current for the ADC sample cycles accumulated in the first value; and
   wherein the first AFE circuit transfers a representation of the first value and a representation of the second value to the host microcontroller in response to a request from the host microcontroller.

2. The battery management system of claim 1, further comprising:
   a second AFE circuit, wherein the second AFE circuit is operated in accordance with a third clock signal that is unsynchronized with the first clock signal, the second AFE circuit comprising:
      a second gain amplifier, including second gain amplifier inputs configured to receive a second battery current associated with one or more cells in the battery system, and second gain amplifier outputs to provide a signal representative of the second battery current and a gain setting of the second gain amplifier;

a second ADC, including second ADC inputs respectively coupled to the second gain amplifier outputs, and providing a digital output representative of the second battery current;

second digital circuitry to (1) accumulate a third value corresponding to a number of ADC sample cycles of the second ADC, and to (2) accumulate a fourth value corresponding to the digital output representation of the second battery current for the ADC sample cycles accumulated in the third value; and wherein the second AFE circuit transfers a representation of the third value and a representation of the fourth value to the host microcontroller in response to a request from the host microcontroller.

3. The battery management system of claim 1, wherein the first AFE includes a first holding register and a second holding register and is configured such that in response to a "snapshot" command from the host microcontroller, the first AFE (1) stores the first value in the first holding register and resets the first value, and (2) stores the second value in the second holding register and resets the second value.

4. The battery management system of claim 3, wherein the AFE is configured to start accumulating the first value following the reset of the first value and start accumulating the second value following the reset of the second value.

5. The battery management system of claim 3, wherein the first AFE is configured such that in response to a "read" command from the host microcontroller, the first AFE sends the value of the first holding register and the value of the second holding register to the host microcontroller.

6. The battery management system of claim 5, wherein the host microcontroller is configured to determine whether the "read" command was executed without a communication error.

7. The battery management system of claim 5, wherein the first AFE is configured such that, following the "read" command, the first holding register and second holding register remain unchanged.

8. The battery management system of claim 3, wherein the first AFE is configured such that in response to an overflow condition in which the second value overflows a maximum value of the second value, (1) an overflow flag is set, (2) the AFE stores the first value in the first holding register and resets the first value, and (3) the AFE stores the second value in the second holding register and resets the second value.

9. The battery management system of claim 8, wherein the first AFE is configured such that in response to the overflow condition in which the overflow flag is set, an interrupt is sent from the first AFE to the host microcontroller to request a "read" command from the host microcontroller.

10. The battery management system of claim 1, wherein the first gain amplifier is a programmable gain amplifier (PGA) and the gain setting of the first gain amplifier is configurable, wherein the first AFE further comprises:

a first digital comparator circuit, including a high threshold comparison and a low threshold comparison against which the digital output representative of the first battery current is compared; and a first automatic gain control (AGC) circuit, coupled to the first digital comparator circuit, and configured to increase the gain setting of the first gain amplifier when the digital output signal from the ADC falls below the low threshold and decrease the gain setting of the first gain amplifier when the digital output signal from the ADC exceeds the high threshold.

11. The battery management system of claim 1, wherein the host microcontroller is configured to calculate a representation of a value of charge transfer corresponding to the first battery current, wherein the representation of the value of charge transfer is calculated using the representation of the first value and the representation of the second value.

12. The battery management system of claim 11, wherein the host microcontroller is configured to calculate the representation of the value of charge transfer by (1) calculating a representation of an average value of the first battery current by dividing the representation of the second value by the representation of the first value, and (2) multiplying the representation of the average value of the first battery current by a time value corresponding to a period over which the first value and the second value were accumulated.

13. A method of operating a battery management system, the method comprising:

receiving, at an amplifier, having a gain setting, included in an analog front end (AFE) circuit, an analog signal representation of a battery current of a battery;

converting, using an analog-to-digital converter (ADC) included in the AFE circuit, the analog signal representation of the battery current to a digital signal representation of the battery current;

accumulating, at the AFE circuit, (1) a first value corresponding to a number of ADC sample cycles, and (2) a second value corresponding to an accumulation of the digital signal representation of the battery current for the ADC sample cycles accumulated in the first value;

transferring, from the AFE circuit to a host microcontroller, the first value and the second value; and calculating, at the host microcontroller, a value representative of an accumulated charge transfer from the battery based upon the first value and the second value.

14. The method of claim 13, comprising:

increasing the gain of the amplifier when the digital signal representation of the battery current falls below a low threshold; and decreasing the gain of the amplifier when the digital signal representation of the battery current exceeds a high threshold.

15. The method of claim 13, comprising:

in response to a "snapshot" command sent by the host microcontroller to the AFE circuit:

storing, at the AFE circuit, the first value in a first holding register and the second value in a second holding register; and then resetting, at the AFE circuit, the first value and the second value.

16. The method of claim 15, comprising:

in response to a "read" command sent by the host microcontroller to the AFE circuit:

transferring, from the AFE circuit to the host microcontroller, the value of the first holding register, the value of the second holding register, and the value of a flag register.

17. The method of claim 16, comprising:

sending, from the host microcontroller to the AFE circuit, a first "snapshot" command;

sending, from the host microcontroller to the AFE circuit, a second "snapshot" command;

measuring, at the host microcontroller, a time period between the first "snapshot" command and the second "snapshot" command;

sending, from the host microcontroller to the AFE circuit, a "read" command;

receiving, following the read command, at the host microcontroller from the AFE circuit, the value of the first holding register and the value of the second holding register; and calculating, at the host microcontroller, the value representative of charge transfer based upon the value of the first holding register, the value of the second holding register, and the measured time period.

18. The method of claim 13, comprising allowing interruption in communication between the AFE and the host microcontroller between instances of transferring, from the AFE circuit to a host microcontroller, the first value and the second value.

19. The method of claim 18, wherein the host microcontroller is configured to determine charge transfer from multiple batteries using respective AFEs corresponding to individual ones of the batteries, including by allowing interruption in communication between a particular AFE and the host microcontroller while the host microcontroller is servicing another AFE.

20. An analog front end (AFE) circuit for use in a charge transfer measurement system, the AFE circuit comprising:

a gain amplifier, including gain amplifier inputs configured to receive a current of interest, and gain amplifier outputs to provide a signal representative of the current of interest and a gain setting of the gain amplifier;

an analog-to-digital converter (ADC), including ADC inputs respectively coupled to the gain amplifier outputs, and providing a digital output representative of the current of interest;

digital circuitry to (1) accumulate a first value corresponding to a number of ADC sample cycles of the ADC, and to (2) accumulate a second value corresponding to the digital output representative of the current of interest for the ADC sample cycles accumulated in the first value; and wherein the AFE circuit transfers a representation of the first value and a representation of the second value to a microcontroller, wherein the transfer occurs over a DC-isolated bus.

* * * * *